US011520932B2

(12) United States Patent
Singh et al.

(10) Patent No.: US 11,520,932 B2
(45) Date of Patent: Dec. 6, 2022

(54) DYNAMIC TRIGGER OF WEB BEACONS

(71) Applicant: PayPal, Inc., San Jose, CA (US)

(72) Inventors: Ravi Raj Singh, Fremont, CA (US); Sanjeev Koranga, Santa Clara, CA (US)

(73) Assignee: PayPal, Inc., San Jose, CA (US)

( * ) Notice: Subject to any disclaimer, the term of this patent is extended or adjusted under 35 U.S.C. 154(b) by 156 days.

(21) Appl. No.: 16/912,460

(22) Filed: Jun. 25, 2020

(65) Prior Publication Data

US 2021/0406401 A1 Dec. 30, 2021

(51) Int. Cl.
| | | |
|---|---|---|
| G06F 21/62 | (2013.01) | |
| G06Q 30/02 | (2012.01) | |
| H04L 67/50 | (2022.01) | |

(52) U.S. Cl.
CPC ..... *G06F 21/6263* (2013.01); *G06Q 30/0255* (2013.01); *H04L 67/535* (2022.05)

(58) Field of Classification Search
CPC .............. G06F 21/6263; G06F 16/904; G06Q 30/0255; G06Q 30/0269; G06Q 30/0257; G06Q 30/02; G06Q 30/0201; G06Q 30/0277; H04L 67/22; H04L 63/1433; H04L 63/1441; H04L 63/1408; H04L 43/00; H04L 43/062; H04L 43/08; H04L 63/1425; H04L 67/02

USPC ............................................... 726/30
See application file for complete search history.

(56) References Cited

U.S. PATENT DOCUMENTS

| | | | |
|---|---|---|---|
| 8,365,150 B2 | 1/2013 | Wong et al. | |
| 9,239,929 B1 * | 1/2016 | Yu | H04W 12/06 |
| 2016/0004673 A1 * | 1/2016 | Cook | G06Q 30/02 |
| | | | 715/234 |
| 2016/0330237 A1 | 11/2016 | Edlabadkar | |
| 2018/0039942 A1 * | 2/2018 | Rogers | H04L 67/22 |
| 2018/0174229 A1 | 6/2018 | Sherwin et al. | |

OTHER PUBLICATIONS

International Search Report and Written Opinion in PCT Appl. No PCT/US2021/037771 dated Sep. 22, 2021, 9 pages.

* cited by examiner

*Primary Examiner* — Melvin H Pollack
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to methods that include receiving an indication of an access by a user to a web page that includes a beacon, and calculating a readiness score for triggering the beacon. The methods may also include determining, based on the readiness score, whether to perform a client-side or server-side triggering of the beacon. The triggering causes data associated with the access to be transmitted to a third-party computer system.

20 Claims, 8 Drawing Sheets

100

DYNAMIC TRIGGER OF WEB BEACONS

BACKGROUND

Technical Field

This disclosure relates generally to computer system operation, and more particularly to managing data transfers between computer systems.

Description of the Related Art

Web beacons may be used by a variety of companies to gather information associated with internet usage. A "web beacon," or simply "beacon," refers to an element included in a web page, email, or other type of internet accessed data item that causes a computer system that accesses the data item to send information related to the access of the data item to a server associated with the beacon. For example, an online advertising service may include a beacon within their advertisements that are then placed on various websites. These beacons may allow the advertising service to collect data related to visitors of the various websites as well as particular actions taken. The advertising service may be capable of determining which of the various websites received the most traffic as well on which websites their advertisements received the most "hits" (users clicking on the advertisements to obtain further information).

DETAILED DESCRIPTION

Figure 1:
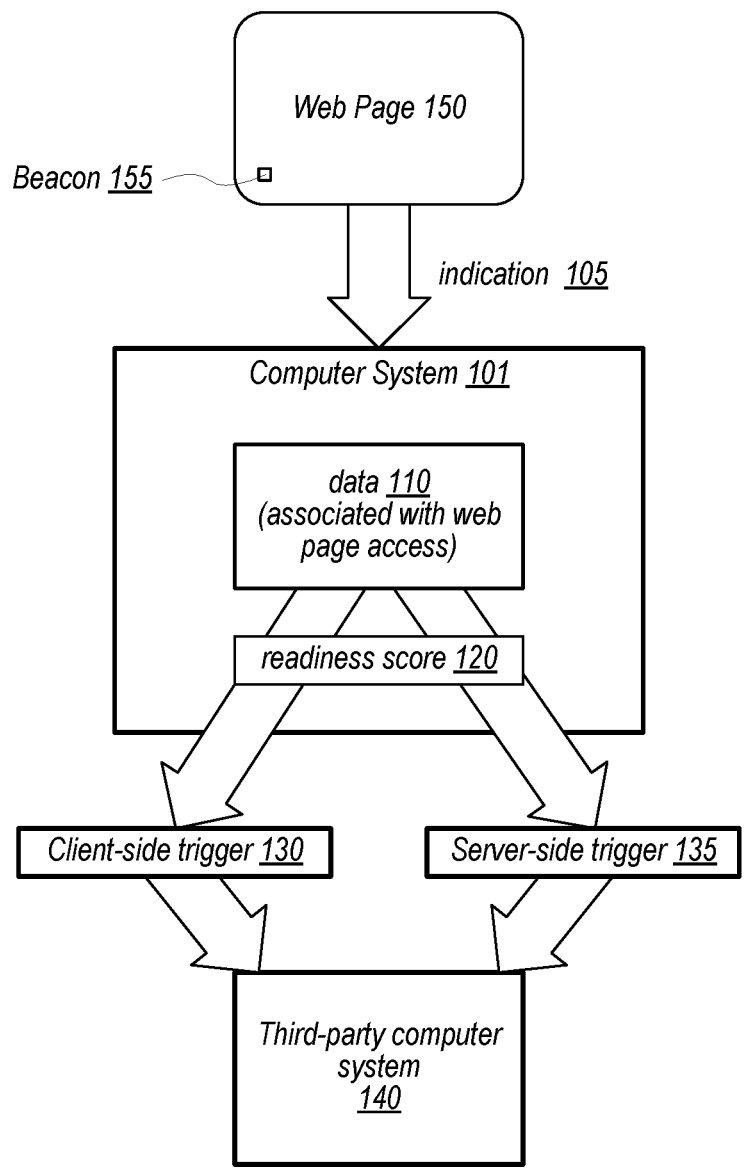
FIG. 1 is a block diagram illustrating an embodiment of a computer system triggering a beacon associated with a third-party computer system.

Various entities may utilize beacons to collect data related to user behavior when accessing various web content such as web pages, emails, cloud-based applications, and the like. As a user browses various web pages or accesses emails, beacons embedded in such content triggers a user's computing device to send data associated with the user to a server computer associated with the beacon. Such data may include an identifier for the user, a Uniform Resource Locator (URL) for a web page or data item that the user was viewing before accessing a data item that includes the beacon, a time of day, a geographic location of the user, an internet service provider for the user, and the like. This data may be used to improve available content to the user, improve search engine results, determine an effectiveness of advertising, as well as many other uses. The more reliable and complete the collected data, the more effective the various uses may be.

Accordingly, a first-party entity with access to internet actions taken by a user, both past and present, may be capable of providing additional data to a third-party entity that utilizes beacons. Using previously collected data, the first-party may be capable of intercepting a third-party beacon, and then enriching beacon data to provide the third-party more complete and reliable data related to the user. In addition, the first-party may have agreements in place with their users, allowing the first-party to share particular types of data while, for example, protecting identities of their users.

In some embodiments, the first party has two techniques for responding to third-party beacons, either responding to the beacon (also referred to as "triggering a beacon") from the computing device of the user (a "client-side trigger") or from a server computer system of the first-party (a "server-side trigger"). Different types of third-party beacons, however, may have various needs in regards to how data is collected in response to a beacon access. Some types of beacons may call for a quick response, while others can accept a delayed response with more data. A client-side trigger may be used to respond quickly, but may result in less complete or less accurate data enrichment due to the client computer system having less access to historical data. A server-side trigger may be used to provide access to a more complete database of historical data, but with a delay to triggering the third-party beacon while data is transferred from client to first-party computer system, enriched through accesses to one or more databases, and then sent to the third-party computer system.

The present inventors have recognized a need for an efficient and reliable method for detecting an access of a third-party beacon by a user, and then making a determination if the third-party beacon is to be triggered on the client-side or the server-side. Such a method may include receiving an indication of an access of a beacon, and then calculating a readiness score for the beacon. Using the readiness score, a determination may be made whether to perform a client-side or server-side triggering of the beacon.

A block diagram of an embodiment of a system that includes a computer system and a third-party computer system is illustrated in FIG. 1. System 100 includes computer system 101 receiving indication 105 that beacon 155 has been accessed on web page 150. Computer system 101 includes data 110 that is used to generate readiness score 120. Readiness score 120 is used to determine whether client-side trigger 130 or server-side trigger 135 is performed to send data 110 to third-party computer system 140.

As illustrated, computer system 101 may represent either a client computer system used to access web page 150 or a first-party computer system that intercepts third-party beacons accessed by a client computer system. A first-party computer system may include a server computer system of a first-party entity that provides a service to a plurality of users. Computer system 101 may be any suitable type of computer system, including for example, a desktop or laptop personal computer, a server computer system, a tablet computer, a smartphone, or a virtual assistant device. A user may subscribe to or otherwise utilize a service provided by a first-party entity. As part of an agreement for use of the service provided by the first-party, the user allows the first-party to intercept third-party beacons for the purpose of enriching data collected by the third-party beacons. To facilitate this enrichment, the first-party may have additional agreements with one or more third-parties that utilize beacons.

Computer system 101 receives indication 105 that a user has accessed web page 150 that includes beacon 155. As stated above, computer system 101 may be a user's client computer system or may be a first-party computer system that provides a service to the user. In a case in which computer system 101 is the client computer system, indication 105 may include an internet address of a third-party associated with beacon 155 that is downloaded to computer system 101 along with other elements of web page 150. In a case in which computer system 101 is the first-party computer system, the user's computer system sends indication 105 to computer system 101 before triggering beacon 155.

Computer system 101, as shown, calculates readiness score 120 for triggering beacon 155. To calculate readiness score 120, computer system 101 uses data 110 that includes data associated with the access of web page 150 by the user. Readiness score 120 includes one or more values that are indicative of how ready the collected data 110 is to trigger beacon 155. In some embodiments, calculating readiness score 120 may include determining a completeness of collected data 110 associated with the access. Computer system 101 may determine that data 110 is missing several pieces of data that could be desired by beacon 155, causing computer system 101 to set a value of readiness score 120 that indicates that additional data should be collected and added to data 110 before being sent. Calculating readiness score 120 may, in some embodiments, include determining a reliability of collected data 110 associated with the access. Portions of data 110 may have values that are not well supported by previously collected data associated with the user or associated with web page 150, and therefore, may be inaccurate, causing computer system 101 to set a value of readiness score 120 that indicates that the unreliable pieces of data should be compared to additional data. In addition, calculating readiness score 120 may include determining a priority for triggering beacon 155. For example, beacon 155 may be recognized by computer system 101 as a type of beacon that expects to be triggered immediately after being accessed, and set a value of readiness score 120 to indicate that data 110 is ready to be sent. In a different example, Based on readiness score 120, computer system 101 determines whether to perform client-side trigger 130 or server-side trigger 135 for beacon 155. As illustrated, if readiness score 120 indicates that data 110 satisfies a level of completeness and reliability that is appropriate to a priority of beacon 155, then computer system 101 may select to utilize client-side trigger 130 for triggering beacon 155. Otherwise, computer system 101 selects server-side trigger 135 for triggering beacon 155. In either case, the triggering causes data 110, associated with the web page 150 access, to be transmitted to third-party computer system 140. In the case in which computer system 101 represents the client computer system, data 110 is sent from the client computer system to the first-party computer system, and subsequently, to third-party computer system 140.

Before beacon 155 is triggered, computer system 101 may collect data associated with the user and add the collected data to a beacon data set that includes data 110 associated with the access. This collected data may include data associated with previous accesses by the user to different web pages that include different beacons. When the user accesses various web pages and/or emails, other beacons are triggered, allowing the first-party and/or a different entity to gather information about the user and actions that the user takes on those web pages and/or emails. This gathered information may be used to monitor and/or analyze online habits of the user. These online habits may include, for example, types of articles the user reads (e.g., news, sports, politics, entertainment, and the like), types of advertisements the user clicks (e.g., apparel, technology, automotive, etc.), particular images and videos the user views, and so forth. The habits may further include monitoring an amount of time spent on various web pages, a time of day that the user views particular types of web pages, a particular location of the user when viewing the particular types of web pages, and other similar pieces of behavioral information. This previously collected data, may be used to determine that the user typically accesses world news articles while at an office location during business hours, and accesses sports-related content during evenings and weekends.

If, for example, web page 150 is a part of a sports web site and the access occurs during typical business hours for the user, then computer system 101 may, after collecting additional data, determine that portions of data 110 are unreliable (e.g., the user accessing sports content during business hours) and, in response, enrich data 110 by indicating that the current access to web page 150 is not typical behavior for the user.

Additionally, computer system 101 may identify a user-privacy agreement for the user. The user-privacy agreement may indicate particular types of data that the user has agreed to share and/or types of data that the user has denied permission to share. Accordingly, computer system 101 may omit, based on a user-privacy agreement, portions of collected data 110 that include personal identifiable information of the user.

As shown, computer system 101 updates readiness score 120 in response to adding the collected information to data 110. Addition of information to data 110 may affect the completeness and/or reliability of data 110, thereby causing readiness score 120 to change. Based on the updated readiness score 120, computer system 101 may cause data 110 to be transmitted to third-party computer system 140. Third-party computer system 140 may use the received data 110 to perform a web analytics service.

It is noted that the embodiment of FIG. 1 is merely an example. Features of the system have been simplified for clarity. As disclosed, the described computer system 101 may represent a client computer system or a first-party computer system. In other embodiments, both client and first-party computer systems may be included. In such embodiments, the described method may be performed by a combination of client and first-party computer systems. An embodiment that includes both client and first-party computer systems is shown in FIG. 2.

Figure 2:
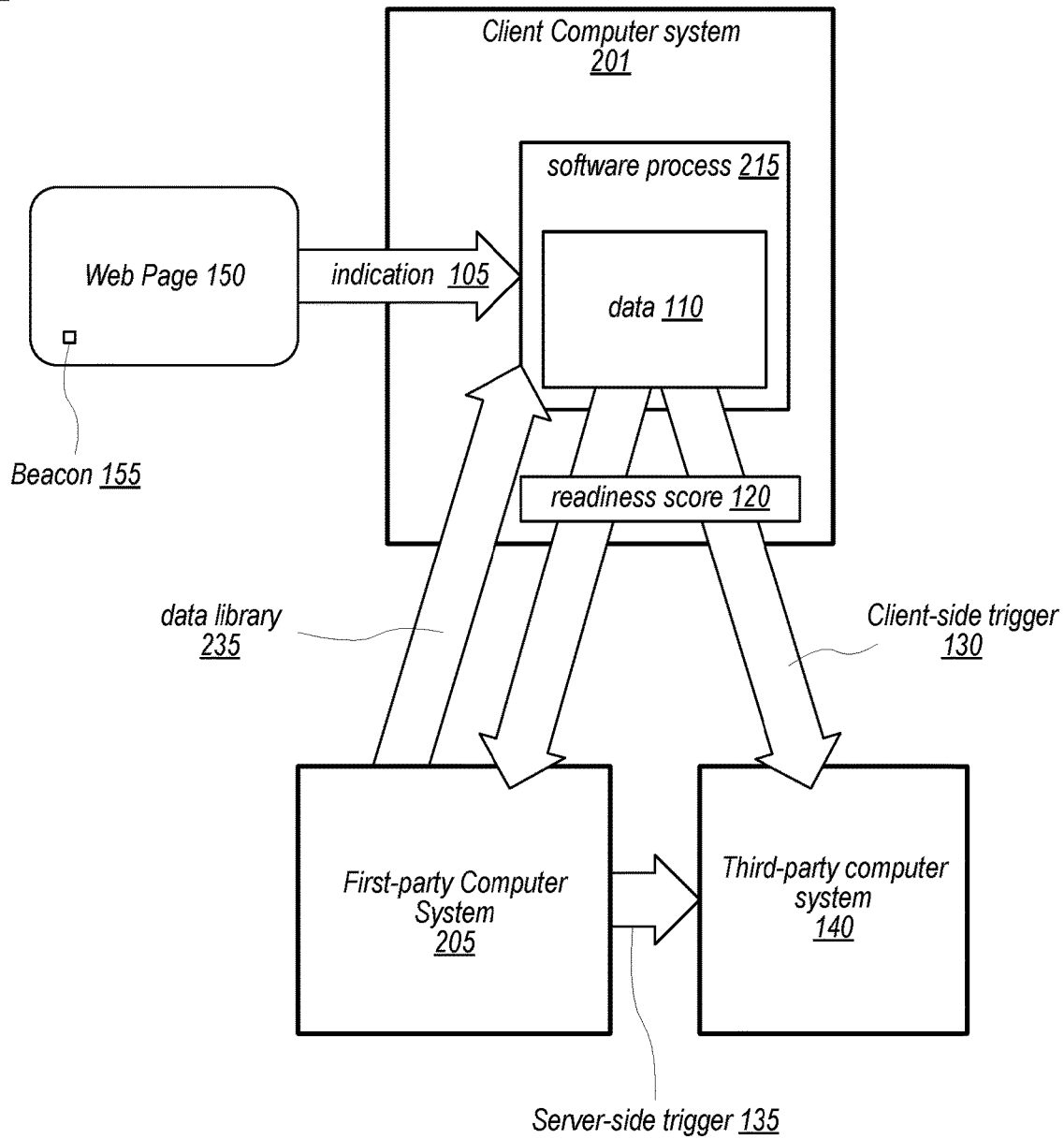
FIG. 2 shows a block diagram of an embodiment of a client computer system communicating with a first-party computer system and a third-party computer system.

Moving to FIG. 2, a system that includes a client computer system, a first-party computer system and a third-party computer system is illustrated. System 200 includes third party computer system 140 and web page 150 from FIG. 1, as well as client computer system 201 and first-party computer system 205. Client computer system 201 includes software process 215 for managing beacons encountered on sources such as visited web pages and received emails.

As illustrated, client computer system 201 receives, from first-party computer system 205, software process 215. In response to a user of client computer system 201 performing an action associated with the first party, first-party computer system 205 sends a copy of software process 215 to client computer system 201. Such actions include, for example, the user logging into an account provided by the first party, accessing a web site of the first party, executing an application of the first party, and the like. In some embodiments, software process 215 is received in response to accessing, by client computer system 201, a first-party beacon associated with first-party computer system 205. In some cases, client computer system 201 may already have a copy of software process 215 from a prior action associated with the first party, and therefore, client computer system 201 may skip receiving another copy.

In addition to software process 215, client computer system may receive one or more configuration files. These configuration files may indicate types of data to collect and/or threshold values for one or more types of beacons. The configuration files may also include information regarding how readiness score 120 is to be calculated, such as algorithms, data weightings, or other information for determining readiness score 120.

After receiving the copy, client computer system 201 executes software process 215, which may then run as a background process while the user utilizes client computer system 201 to perform one or more other actions, including, for example, browsing the internet. As client computer system 201 receives information associated with web pages, emails, and/or other documents, software process 215 determines if any received information is indicative of a beacon.

Software process 215, as shown, eventually receives indication 105 that the user has accessed web page 150 that includes beacon 155. Beacon 155 is an element included in web page 150 for a third party. Beacon 155, in various embodiments, may or may not be visible when web page 150 is rendered on a display associated with client computer system 201. When beacon 155 is accessed, however, client computer system 201 is requested to send a response that may include a particular amount of data associated with the user's access to web page 150. Software process 215 intercepts beacon 155, thereby preventing client computer system 201 from triggering beacon 155 until software process 215 indicates that triggering of beacon 155 is allowed. In response to receiving the indication of the access of beacon 155, software process 215 gathers data 110 which includes data associated with the user and/or associated with the access of web page 150. Data 110 includes information stored within and/or accessible by client computer system 201, such as in cached web pages, hypertext transport protocol (HTTP) cookies, web browser history files, and the like.

Software process 215 calculates readiness score 120 for triggering beacon 155. As illustrated, readiness score 120 is based on a determined priority for triggering beacon 155. In other embodiments, however, readiness score 120 may be based, in addition to, or in place of the priority, on a determined reliability and/or completeness of collected data 110 associated with the access of web page 150. Readiness score 120 may be used to provide an indication to software process 215 of a state of data 110 as compared to what data is requested by beacon 155. For example, in some embodiments, beacon 155 may request data such as an IP address of client computer system 201, an identification value for the user, and a URL indicating a web site that the user was visiting before accessing web page 150. In other embodiments, beacon 155 may request all of this data as well as additional data about the user such as the user's interest, based on recent web browsing. For example, additional data may include information about products that the user may be interested in based on advertisements and/or online retailers the user has accessed, or hobbies of interest to the user based on articles that the user has recently accessed via the internet.

As shown, software process 215, based on readiness score 120, determines whether to perform client-side trigger 130 or server-side trigger 135 of beacon 155. Triggering of beacon 155 causes data 110, associated with the access of web page 150, to be transmitted to third-party computer system 140. After readiness score 120 has been calculated, software process 215 compares the calculated value to a threshold value. In various embodiments, the threshold value may be a single threshold used for any third-party beacon, may be a threshold value set specifically for the third party associated with beacon 155, or may be set specifically for beacon 155. If readiness score 120 satisfies the threshold value, then client computer system 201 performs client-side trigger 130 to send data 110 to third-party computer system 140.

If readiness score 120 does not satisfy the threshold, then client computer system 201 sends data 110, readiness score 120, and information regarding beacon 155 to first-party computer system 205. As will be disclosed in more detail below, first-party computer system collects additional information to add to data 110 until readiness score 120 satisfies the threshold and server-side trigger 135 is performed.

In some embodiments, after a decision is made to perform client-side trigger 130, software process 215 continues to collect more information to add to data 110 before triggering beacon 155. For example, software process 215 may compare readiness score 120 to more than one threshold value. A first threshold value may be used to determine if client-side trigger 130 or server-side trigger 135 is performed. If client-side trigger 130 is selected, then a second threshold value may be used to determine if client-side trigger is ready to be performed. Software process 215, using one or more configuration files received with software process 215, determines types of data to collect. For example, when software process 215 is received by client computer system 201, data library 235 may be received as part of, or in addition to, software process 215. Software process 215 may, based on the configuration files, collect data from this data library that is relevant to beacon 155, and then perform client-side trigger 130. As software process 215 adds information to data 110, readiness score 120 is updated and compared to the second threshold value until the second threshold is satisfied and client-side trigger 130 is performed.

In some embodiments, software process 215 may determine, based on readiness score 120, to perform client-side trigger 130 of beacon 155 for a first portion of data 110, and determine to perform server-side trigger 135 of beacon 155 for a second portion of data 110. For example, beacon 155 may include a high priority for certain types of data that are available to software process 215 on client computer system 201, but include a lower priority for other types of data that are not readily available to software process 215 and/or types of data that may be available, but the available data has a low reliability.

To satisfy the threshold value, readiness score 120, may be above or below the threshold depending on how readiness score 120 is defined. In some embodiments, readiness score 120 is defined such that a higher value indicates a higher level of readiness, e.g., readiness score 120 increases as more information is added to data 110. In other embodiments, a higher value of readiness score 120 may reflect an indication of an increased amount of information missing from data 110. E.g., more missing information results in a higher readiness score 120.

It is noted that the embodiment of FIG. 2 is merely one example of a client computer system triggering a beacon. Only elements used to describe the disclosed concepts are illustrated. In other embodiments, additional elements may be included. For example, a single beacon is shown in the web page of FIG. 2. In other embodiments, one web page may include multiple beacons, these beacons processed individually or in groups using the described techniques.

As stated above, systems described herein may include both client and first-party computer systems. FIG. 2 describes actions performed by the client computer system. Operation of a first-party computer system for triggering a beacon is described in FIG. 3.

Figure 3:
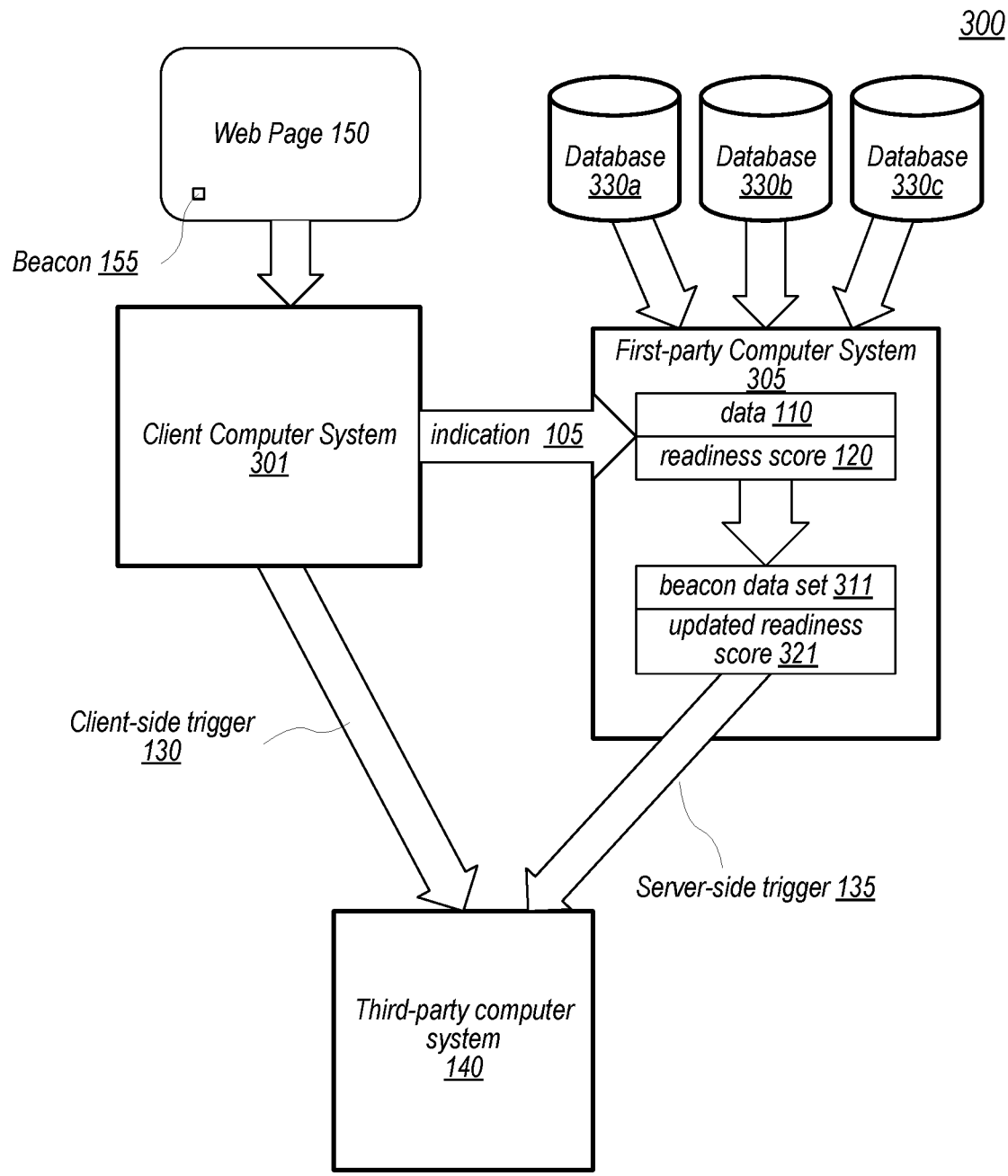
FIG. 3 depicts a block diagram of an embodiment of a first-party computer system communicating with a client computer system and a third-party computer system.

Turning to FIG. 3, a system for triggering beacons is depicted, the system including a client computer system, a first-party computer system, and a third-party computer system. System 300 includes third party computer system 140 and web page 150 from FIG. 1, as well as client computer system 301 and first-party computer system 305. In some embodiments, client computer system 301 and first-party computer system 305 correspond to client computer system 201 and first-party computer system 205 in FIG. 2.

As illustrated, first-party computer system 305 receives, from client computer system 301, indication 105 of an access by a user to web page 150 that includes beacon 155. Indication 105 includes data 110 associated with the access and readiness score 120 for triggering beacon 155. The user accesses web page 150 using client computer system 301. In response to determining that web page 150 includes beacon 155, client computer system 301 determines, using a determined value of readiness score 120, that server-side trigger 135 will be used, and therefore, sends indication 105 to first-party computer system 305. In various embodiments, server-side trigger 135 may be performed in place of, or in addition to, client-side trigger 130.

First-party computer system 305, as shown, collects data associated with the user and adds the collected data to beacon data set 311 that includes data 110 associated with the access of web page 150. First-party computer system 305 collects information to add to data 110 with a goal of improving readiness score 120 to satisfy a threshold for triggering beacon 155. First-party computer system 305 has access to databases 330a-330c (collectively databases 330). Databases 330 may, in various embodiments, be managed by the first party, the third-party associated with beacon 155, or one or more different entities, or a combination thereof. Databases 330 may include information associated with any combination of the user, web page 150, and beacon 155. First-party computer system 305 accesses the information on databases 330 and adds any relevant information to the received data 110 to generate beacon data set 311.

As shown, collecting data associated with the user includes accessing one or more of databases 330 in response to determining that a particular type of information is not currently included in beacon data set 311. For example, beacon 155 may indicate a request for information regarding hobbies or interests of the user. Since such information may not be readily available from the user's recent web browsing, first-party computer system 305 may search for such information in one or more of databases 330. Database 330b may include indications of the user accessing articles and products associated with cooking. First-party computer system 305 may, therefore, add an indication of cooking to beacon data set 311 as an interest of the user.

Collecting data associated with the user may also include accessing one or more of databases 330 to determine a reliability of a particular piece of information that is currently included in beacon data set 311. Continuing the example, client computer system 301 may include a particular sports team as an interest of the user based on an article the user accessed recently. By accessing one of databases 330, first-party computer system 305 may determine that the user has accessed articles and/or products of a rival of the particular sports team with a much greater frequency. In response to this determination, first-party computer system 305 may modify beacon data set 311 to indicate the user's interest in the rival sports team in place of the particular sports team.

First-party computer system 305, as illustrated, updates readiness score 120 based on the collected data in beacon data set 311. In various embodiments, readiness score 120 is based on a priority of beacon 155, a determined reliability of data 110, and/or a determined completeness of data 110 associated with the access of web page 150. First-party computer system 305 determines updated readiness score 321 based on data 110 and readiness score 120, and then determines an updated value using the collected data added to beacon data set 311. Updated readiness score 321 may, therefore, be based on the priority of beacon 155, a determined reliability of beacon data set 311, and/or a determined completeness of beacon data set 311.

As depicted, first-party computer system 305 determines, based on updated readiness score 321, to perform server-side trigger 135 to trigger the beacon. This triggering causes beacon data set 311 to be transmitted to third-party computer system 140. As collected data is added to beacon data set 311, updated readiness score 321 may approach the threshold value, eventually satisfying the threshold value, thereby causing first-party computer system 305 to trigger beacon 155 and sending beacon data set 311 to third-party computer system 140.

It is noted that FIG. 3 is an example of a first-party computer system triggering a beacon. FIG. 3 includes only elements for describing the disclosed concepts. Additional elements may be included in other embodiments. For example, three databases are illustrated, but any suitable number of databases may be available for the first-party computer system to access when collecting additional data.

FIGS. 1-3 describe various embodiments of a system for providing a suitable amount and quality of data when triggering third-party beacons. Beacons may be encounter in a variety of scenarios. One such scenario is shown in FIG. 4.

Figure 4:
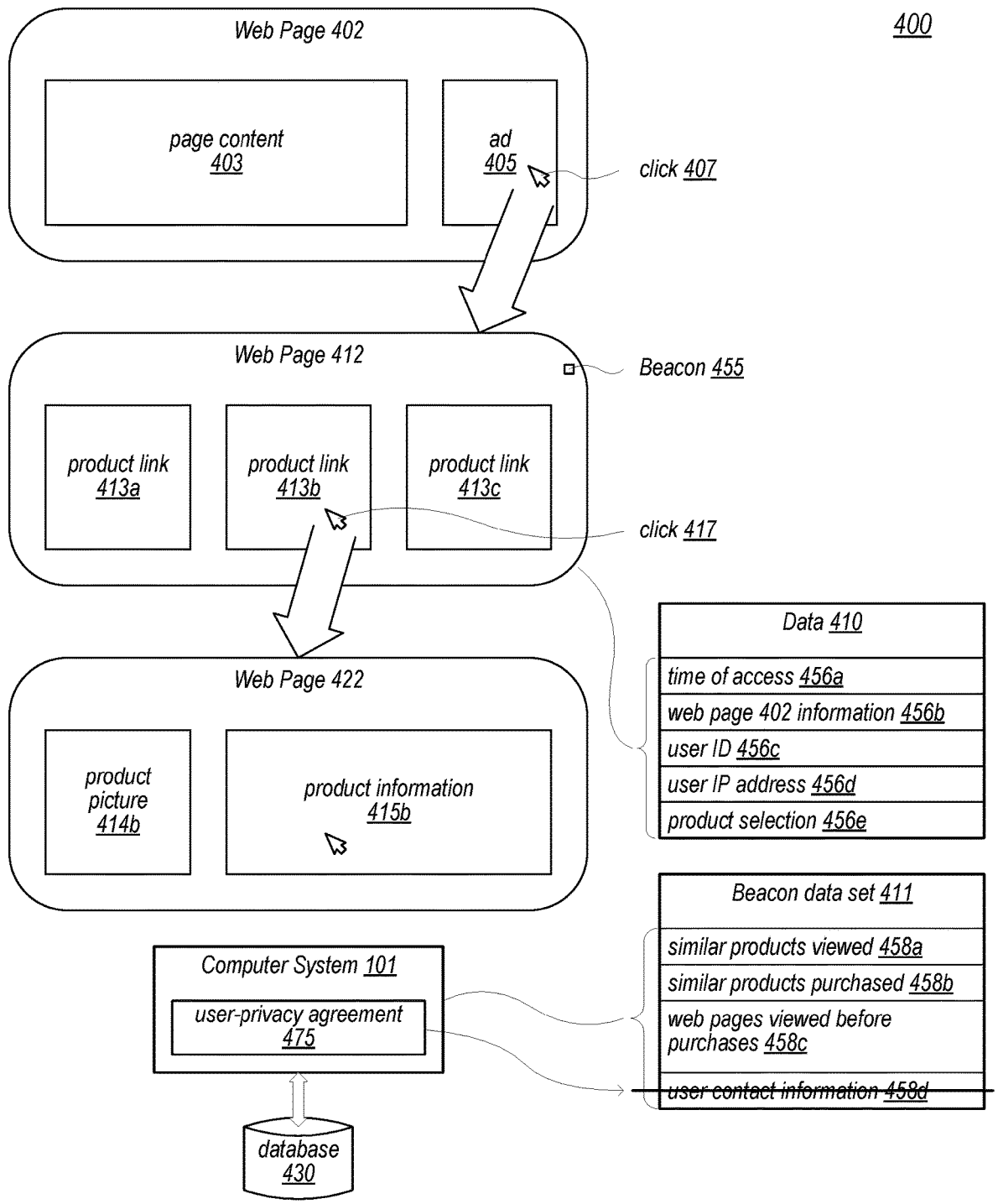
FIG. 4 illustrates views of three web pages, including one web page that includes a beacon.

Proceeding to FIG. 4, an example of web browsing that include an access of a beacon is illustrated. Example 400 includes a first access to web page 402, followed by accesses to web pages 412 and 422 in succession. Beacon 455 is accessed when web page 412 is accessed. The access of beacon 455 causes computer system 101 to receive data 410 and to generate beacon data set 411. Example 400 may be performed by any of the systems shown in FIGS. 1-3.

At a first point in time, a user accesses web page 402, causing web page 402 to be displayed on a computer system of the user, such as client computer system 201 or 301 in FIGS. 2 and 3. Web page 402 includes page content 403 and advertisement (ad) 405. Page content 403 may include any suitable content displayed in a web page, such as an article, a video, still images, audio, and the like. Ad 405 may be an advertisement for any suitable product, media, service, or combination thereof. Ad 405 may be placed by the owner of page content 403, or by a different entity who purchased advertising space on web page 402. The user performs click 407 on ad 405, causing web page 412 to be accessed at a second point in time, subsequent to the first point in time.

Accessing web page 412 causes product links 413*a*-413*c* (collectively product links 413) to be displayed on the user's computer system. Each product link may include text and/or an image associated with a respective product. A particular product link 413 may be clicked to access additional information regarding a respective product. Web page 412 further includes beacon 455, which is accessed in conjunction with the access to web page 412. Although beacon 455 is shown as a small square on web page 412, beacon 455, in some embodiments, may not have any visible element displayed on the user's computer system.

As illustrated, the user's computer system, in response to receiving an indication that beacon 455 is included in web page 412, determines an initial readiness score and compares the initial readiness score to a threshold value to determine if a client-side trigger, a server-side trigger, or in some cases, both, will be performed. Before determining the initial readiness score, the user's computer system collects at least a portion of data 410. The collected portion of data 410 is used in determining the initial readiness score.

If a client-side trigger is to be performed, then computer system 101 corresponds to a client computer system such as client computer systems 201 and 301. If a server-side trigger is to be performed, then computer system 101 corresponds to a first-party computer system such as first-party computer systems 205 and 305. If both client-side and server-side triggers are to be performed, then actions ascribed to computer system 101 may be performed by a client and/or a first-party computer system.

In example 400, a server-side trigger is selected and computer system 101 corresponds to first-party computer system 205 or 305. The user's computer system collects data 410 and sends, to computer system 101, an indication that web page 412 includes beacon 455 along with the collected data 410. In response to receiving the indication that beacon 455 is included in web page 412, computer system 101 collects data associated with the user and adds the collected data to beacon data set 411 that includes data 410. This collected data may include data associated with previous accesses by the user to different web pages that include different beacons. For example, information associated with the access of web page 402 may be included in beacon data set 411, including information such as the user's interaction with web page 402 leading up to click 407 that causes the access to web page 412. In addition, information related to previous accesses to web pages similar to web pages 402 and 412 may be collected and added to beacon data set 411.

As described above, computer system 101 may query one or more databases to identify data associated with the user. While waiting for responses to such queries, the user may perform click 417, thereby selecting product link 413*b* and causing web page 422 to be displayed, including product picture 414*b* and product information 415*b*. The user's computer system may send data associated with the access to web page 422 to computer system 101, which computer system 101 may then add to beacon data set 411. Adding data associated with the access of web page 422 demonstrates that not only data associated with previous web page accesses, but also subsequent web page accesses may be included in beacon data set 411 and sent to a third-party computer system when beacon 455 is triggered.

Computer system 101 updates the readiness score in response to adding the collected data to beacon data set 411. Based on the updated readiness score, computer system 101 may determine that the threshold value is satisfied and beacon data set 411 is transmitted to the third-party computer system. The third-party computer system may, in some embodiments, perform a web analytics service, utilizing beacon data set 411 in various analysis.

Various examples of the types of information included in data 410 and beacon data set 411 are shown in FIG. 4. Data 410, for example, may include time of access 456*a*, which indicates a calendar date and time of day when web page 412 was accessed by the user's computer system. Data 410 further includes web page 402 information 456*b*, which includes information associated with the access of web page 402 that led to the access of web page 412. This information 456*b* may include a time stamp of when web page 402 was accessed, an IP address and/or URL for web page 402, an identity of an entity that is associated with web page 402, and the like. User ID 456*c* and user IP address 456*d* are pieces of information that may be used to identify the particular user who performed click 407 to access web page 412. Data 410 may further include product selection 456*e*, an indication of a product shown on web page 412 that is selected by the user, e.g., the product associated with product link 413*b*.

As described, computer system 101 collects additional data to add to data 410, thereby creating beacon data set 411. This additional data provides additional data to the third-party computer system, which may enable the third-party computer system to increase an accuracy of, and/or decrease a time to, generate their analysis. The additional collected data includes similar products viewed 458*a*, similar products purchased 458*b*, web pages viewed before purchases 458*c*, and user contact information 458*d*. Similar products viewed 458*a* includes indications of products that the user has viewed prior to accessing web page 412. In a like manner, similar products purchased 458*b* includes indications of products that the user has purchased prior to accessing web page 412. Computer system 101 may use any suitable time period for looking for previous product viewings and purchases, such as, twenty-four hours, one week, one month, one year, and the like. For identified purchases, computer system 101 may identify a web page or pages that the user visited leading up to an identified purchase. User contact information 458*d* may include any suitable method for contacting the user, such as an email address, a home address, a phone number, and the like.

In some embodiments, computer system 101 accesses database 430 to identify user-privacy agreement 475. Database 430 may be one of a plurality of databases accessible by computer system 101. The first-party may have user-privacy agreements with one or more users of the first party's services. Such user-privacy agreements may include one or more restrictions that the user places on the first party regarding use of information associated with the user's web browsing. For example, a user may provide contact information to the first party as part of an agreement for the user to access services provided by the first party. User-privacy agreement 475, however, may restrict the first party from sharing the provided contact information to any third party. Other types of information that may be used to determine an identity of the user, or other types of information that the user may consider private, may also be restricted from sharing by the first party. Accordingly, adding the collected data to beacon data set 411 includes omitting, based on user-privacy agreement 475, collected data that includes personal information of the user, such as user contact information 458d. As depicted in FIG. 4, user contact information 458d is stricken from beacon data set 411 to indicate this omission. In other embodiments, other personal identity data, including information received in data 410 (e.g., user ID 456c and user IP address 456d), may be omitted from beacon data set 411 based on user-privacy agreement 475.

In embodiments in which both client-side and server-side triggers are performed, a first-party computer system may identify data already sent to a third-party computer system by a client computer system, and omits previously sent data from beacon data set 411 to, for example, avoid repetition. In example 400, computer system 101 may identify portions of data 410 associated with the user that has been transmitted to the third-party computer system by the user's computer system. As part of adding collected data to beacon data set 411, computer system 101 omits the identified portions of data 110.

It is noted that the example of FIG. 4 is presented to demonstrate disclosed concepts. The disclosed example is not intended to be limiting, and, examples of other embodiments may include different elements. For example, example 400 illustrates an access of a beacon in response to clicking an advertisement. It is contemplated that beacons may be accessed in response to web pages associated with content other than advertisements or other presentations of products or services for sale. In other embodiments, beacons may be accessed on web pages that include news and/or sports articles, social media content, streaming media content, and the like.

Figure 5:
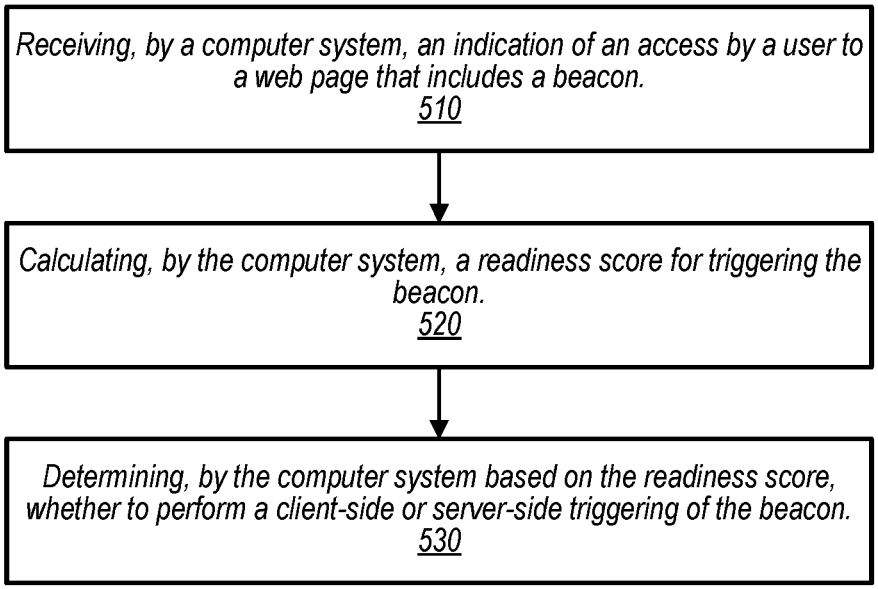
FIG. 5 shows a flow diagram of an embodiment of a method for triggering, by a computer system, a beacon accessed on a web page.
Figure 6:
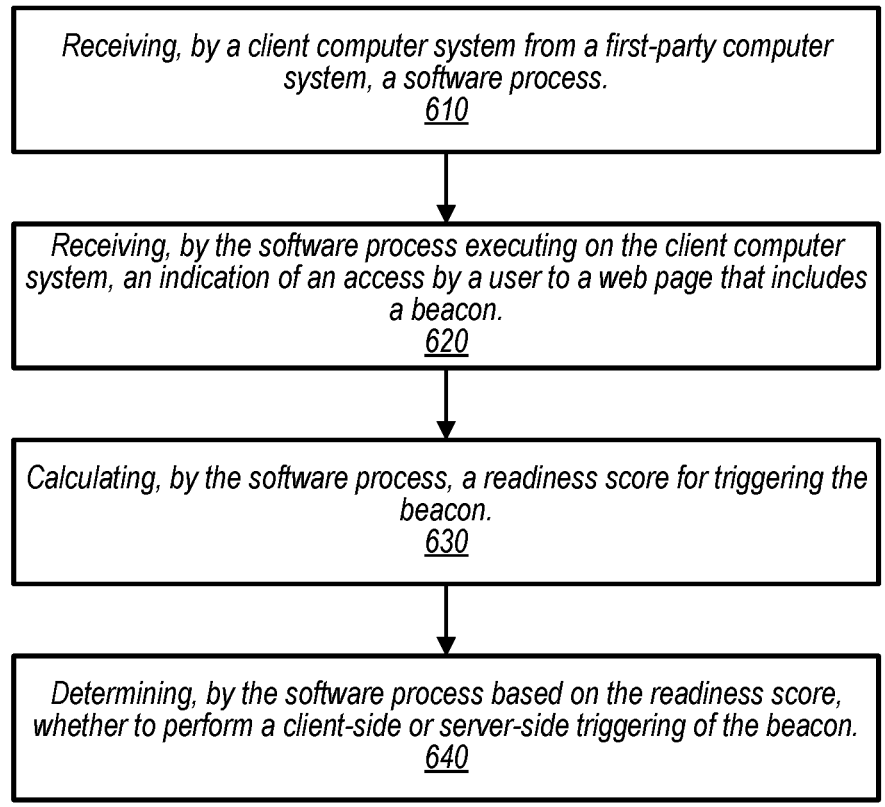
FIG. 6 shows a flow diagram of an embodiment of a method for triggering, by a client computer system, a beacon accessed by the client computer system.
Figure 7:
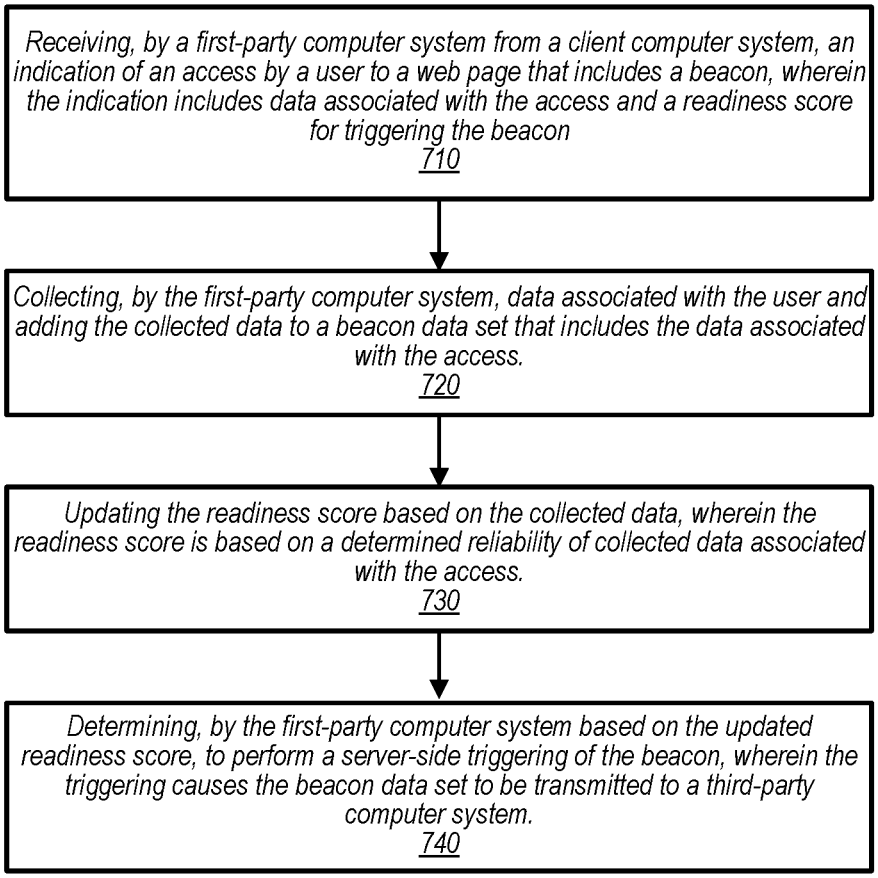
FIG. 7 shows a flow diagram of an embodiment of a method for triggering, by a first-party computer system, a beacon accessed by a client computer system.

FIGS. 1-3 describe various embodiments of a system for triggering third-party beacons. Triggering of beacons may be performed by such systems using a variety of methods. FIGS. 5-7 depict three such methods.

Moving now to FIG. 5, a flow diagram of an embodiment of a method for triggering a beacon is depicted. In various embodiments, method 500 may be performed by computer system 101 in FIG. 1 to determine how beacon 155 will be triggered. For example, computer system 101 may include (or have access to) a non-transitory, computer-readable medium having program instructions stored thereon that are executable by the computer system to cause the operations described with reference to FIG. 5.

At block 510, method 500 includes receiving an indication of an access by a user to a web page that includes a beacon. The user accesses web page 150 via a computer system such as a desktop, laptop, a smartphone, tablet computer, and the like. In some embodiments, the user may access web page 150 via computer system 101. Web page 150 corresponds to any suitable web page accessible via the internet, and may contain any suitable content. This content includes beacon 155, which requests one or more pieces of information from the user's computer system. Beacon 155 may be placed in web page 150 by an entity that controls the content of web page 150 or by an entity that is authorized to place content, e.g., advertisements, in web page 150. The beacon may direct the requested information to a third party, such as third-party computer system 140.

Computer system 101 receives indication 105 that the user has accessed web page 150 that includes beacon 155. Data 110, including data associated with the access of web page 150, is collected in response to accessing beacon 155. In some embodiments, in response to receiving indication 105, computer system 101 collects data associated with the user. This collected data may be added to a beacon data set that includes data 110.

Method 500, at block 520, further includes calculating a readiness score for triggering the beacon. Readiness score 120 includes one or more values that provide an indication of how ready the collected data is for sending to third-party computer system 140. In some embodiments, calculating readiness score 120 includes determining a priority for triggering beacon 155. Beacon 155 may include an indication of, or computer system 101 may include configuration files that indicate, a priority for triggering beacon 155. In some cases, beacons may request that requested data is sent within a particular amount of time from when the beacon was accessed. The beacons may, in some cases, provide an indication whether a response time or a readiness of the data has a higher priority. Calculating readiness score 120 includes, in some embodiments, determining a completeness of the collected data associated with the access of web page 150. For example, beacon 155 may request a number of pieces of information. Readiness score 120 may provide an indication as to how much of the requested information is included in the collected data.

Calculating the readiness score may, in some embodiments, further include determining a reliability of the collected data associated with the access. The requested pieces of information may include both deterministic data that can be accurately determined as well as more intuitive data that is estimated or inferred from available information. Deterministic data includes, for example, a time stamp associated with the user's access of web page 150. Intuitive data, for example, may include values that indicate the user's interests, preferences, or other information that may not be definitively determined based on the available data. For example, web page 150 may include a product description for a tee shirt printed with a comic book character. A time of day when the user clicks a link or enters a URL to access web page 150 may be determined with a high level of accuracy. The interest of the user, however, may not be easily discernable. Does the user like tee shirts in general, or the particular character, or comic books? Or is the user shopping for a gift for someone else and has no personal interest in either tee shirts or comic book characters? Without additional information, computer system 101 may make a determination as to the user's interest that is unreliable. Collecting additional information, such as from recent accesses to other web pages may provide additional clues to help make a more reliable determination, if this additional information is available.

Method 500 also includes, at block 530, determining, based on the readiness score, whether to perform a client-side or server-side triggering of the beacon. This triggering causes data 110, associated with the access to web page 150, to be transmitted to third-party computer system 140. If readiness score 120 satisfies a threshold value, then client-side trigger 130 is chosen, resulting in data 110 being sent to third-party computer system 140 from the user's computer system. In some embodiments, the user's computer system may collect additional data and add this to a beacon data set before performing client-side trigger 130. This additional collected data may include data associated with previous accesses by the user to different web pages that include different beacons.

If the threshold value is not satisfied, then server-side trigger 135 is selected, resulting in data 110 being sent from the user's computer to a first-party computer system. The first-party computer system collects additional data, for example, from one or more databases that store data associated with the user and/or data associated with previously accessed beacons, including, e.g., beacon 155. This additional collected data is added to a beacon data set.

Whether client-side trigger 130 or server-side trigger 135 is performed, readiness score 120 may be updated in response to adding the additional collected data to the beacon data set. Based on the updated readiness score, the beacon data set may be transmitted to third-party computer system 140. In some embodiments, third-party computer system 140 performs a web analytics service, for example, determining an effectiveness of advertising for the tee shirt.

It is noted that the method of FIG. 5 includes elements 510-530. Method 500 may be repeated in response to other accesses to other beacons. In some cases, method 500 may be performed concurrently with itself, for example, if multiple beacons are accessed on a same web page. In such cases, two or more cores, or process threads in a single core, in computer system 101 may each perform method 500 independently from one another. In other embodiments, multiple performances of method 500 may work coherently, reusing data collected for one beacon for triggering a different beacon. Although three blocks are shown for method 500, additional blocks may also be included in other embodiments. For example, an additional block may include collecting data in response to the indication.

Turning now to FIG. 6, a flow diagram of an embodiment of a method for managing an access to a beacon by a client computer system is depicted. Method 600 may be performed by client computer system 201 in FIG. 2 to determine how beacon 155 will be triggered. Client computer system 201 may, for example, include (or have access to) a non-transitory, computer-readable medium having program instructions stored thereon that are executable by the computer system to cause the operations described with reference to FIG. 6.

Method 600, at block 610, includes receiving, by a client computer system from a first-party computer system, a software process. Software process 215 is received by client computer system 201 from first-party computer system 205 in response, for example, to a user of client computer system 201 logging into an account of a service provided by the first party. In some embodiments, software process 215 is received in response to accessing, by client computer system 201, a first-party beacon associated with first-party computer system 205, for example, by accessing a web page that includes the first-party beacon. In addition to software process 215 (or included with software process 215), client computer system 201 may receive one or more configuration files. These configuration files may include parameters and conditions associated with the operation of software process 215, such as rules and or weighting values for determining readiness score 120, and/or threshold values used for determining whether to perform client-side trigger 130 or server-side trigger 135. After the receiving, client computer system 201 executes software process 215.

At block 620, method 600 includes receiving, by the software process executing on the client computer system, an indication of an access by a user to a web page that includes a beacon. Software process 215 may be performed in the background of client computer system 201 while client computer system 201 is used by the user to browse web pages on the internet. The user navigates to web page 150, causing client computer system 201 to access beacon 155. Indication 105 is received by software process 215, indicating that beacon 155 has been accessed. In response to indication 105, data 110, including data associated with the access of web page 150, is collected by software process 215. This data may be added to a beacon data set that will be sent to third-party computer system 140 when beacon 155 is triggered. In addition, data associated with the user may be collected and added to the beacon data set. Collecting the additional data associated with the user and/or the access may include determining, using the one or more configuration files received with software process 215, types of data to collect. These configuration files may indicate whether to collect, for example, personal information of the user, information regarding the shopping habits of the user, indications of interests of the user, and the like.

Method 600 also includes, at block 630, calculating, by the software process, a readiness score for triggering the beacon. As described above, readiness score 120 provides an indication of whether the beacon data set is ready to be sent to third-party computer system 140. Readiness score may be based on a determined priority for triggering the included beacon. In addition, readiness score 120 may be further based on a determined reliability and/or a completeness of collected data in the beacon data set.

In addition, method 600 includes, at block 640, determining, by the software process based on the readiness score, whether to perform a client-side or server-side triggering of the beacon. Software process 215 compares readiness score 120 to one or more threshold values, for example, threshold values received as part of the one or more configuration files. If the comparison indicates that the collected data is ready, then software process 215 determines that client-side trigger 130 will be performed, and beacon data set is sent to third-party computer system 140 from client computer system 201. Client computer system 201 may also send the beacon data set to first-party computer system 205, using, for example the first-party beacon. In some embodiments, software process 215 may determine, based on readiness score 120, to perform client-side trigger 130 for a first portion of the beacon data set, and server-side trigger 135 for a second portion of the beacon data set.

If software process 215 selects client-side trigger 130 for triggering beacon 155, software process 215 may delay performing client-side trigger 130 in order to collect additional data for the beacon data set. For example, a first threshold value may be satisfied that results in selecting client-side trigger 130. A second threshold value, however, may need to be satisfied before client-side trigger 130 is performed. Readiness score 120 is updated in response to adding additional collected data, and compared to the second threshold value. This updating may be repeated until the second threshold is satisfied and client-side trigger 130 is performed. In some embodiments, a time limit may be placed on the repeating such that client-side trigger 130 is performed by the end of the time limit regardless if the second threshold is satisfied.

The triggering causes the beacon data set, including data 110, to be transmitted to third-party computer system 140. As described above, third-party computer system 140 may perform a web analytics service using the beacon data set.

It is noted that the method of FIG. 6 includes elements 610-640. Blocks 620-640 of method 600 may be repeated in response to additional accesses by the client computer system to other beacons. In some cases, method 600 may be performed by one or more processor cores in the client computer system in response to the other beacon accesses. Multiple performances of method 600 may work independently or coherently, e.g., by using collected data for multiple beacons. Although four blocks are shown for method 600, additional blocks may also be included in other embodiments. For example, an additional block may include recalculating the readiness score after collecting additional data.

Proceeding now to FIG. 7, a flow diagram of an embodiment of a method for receiving an indication of a beacon access by a client computer system is shown. Method 700 may be performed by first-party computer system 305 in FIG. 3 to provide additional data associated with a user of client computer system 301 before triggering beacon 155. First-party computer system 305 may, for example, include (or have access to) a non-transitory, computer-readable medium having program instructions stored thereon that are executable by the computer system to cause the operations described with reference to FIG. 7.

At block 710, method 700 includes receiving, by a first-party computer system from a client computer system, an indication of an access by a user to a web page that includes a beacon. Indication 105 is received by first-party computer system 305 from client computer system 301. Indication 105 alerts first-party computer to an access, by a user of client computer system 301, of beacon 155 included on web page 150. Indication 105 includes data 110, associated with the access, and an initial value of readiness score 120, which is used for triggering the beacon.

Method 700 also includes, at block 720, collecting, by the first-party computer system, data associated with the user and adding the collected data to a beacon data set that includes the data associated with the access. In response to receiving indication 105, data associated with the user is collected by first-party computer system 305 and added to beacon data set 311. Beacon data set 311 also includes data associated with the access of web page 150. Collecting data associated with the user includes accessing a particular database (e.g., database 330a) of databases 330 in response to determining that a particular type of information is not currently included in beacon data set 311. A particular one of databases 330 may also be accessed to determine a reliability of a particular piece of information that is currently included in beacon data set 311. For example, beacon 155 may request data concerning recent purchases made by the user as well as an indication of a favorite color of the user. The access to web page 150 may not include any indications of a purchase by the user, so database 330a may be accessed to determine if data related to recent purchases is available, and first-party computer system adds available data to beacon data set 311. Web page 150 may include a product description for a blue product. Based on the blue product, the favorite color of the user may initially be determined as blue and this information added to data 110. To determine a reliability of blue as the user's favorite color, first-party computer system 305 access database 330b, which may include information regarding the user's personal preferences, including that the user most frequently purchases red items when color choices are available. First-party computer system modifies beacon data set 311 to indicate red as the user's favorite color.

Collecting data associated with the user may also include accessing a particular database of databases 330 to identify a user-privacy agreement applicable to the user. This user-privacy agreement may indicate that the user does not agree to sharing any information with a third party that could be used to identify the user. Adding the collected data to beacon data set 311 includes omitting, based on the user-privacy agreement, collected data that includes personal identifiable information of the user, such as usernames, email addresses, phone numbers, and the like.

While first-party computer system 305 is collecting additional data to add to beacon data set 311, client computer system 301, in some embodiments, may send some or all of data 110 to third-party computer system 140 by performing client-side trigger 130. In such embodiments, first-party computer system identifies any portions of data 110 that have been transmitted to third-party computer system 140 by client computer system 301. Adding the collected data to beacon data set 311 includes omitting the identified portions of data 110.

At block 730, method 700 also includes updating the readiness score based on the collected data. Readiness score 120 is based on a determined reliability of collected data associated with the access of web page 150. In some embodiments, updating readiness score 120 includes determining a completeness of beacon data set 311. Based on collected data that is added to beacon data set 311, readiness score 120 is updated to generate updated readiness score 321. In some embodiments, updated readiness score 321 is also based on a priority and/or time frame for triggering beacon 155. For example, beacon 155 may include an indication that the beacon should be trigger within a particular amount of time from being accessed. Updated readiness score 321 may continue to be updated as more data is added to beacon data set 311.

Method 700, at block 740, further includes determining, by the first-party computer system based on the updated readiness score, to perform a server-side triggering of the beacon. Once updated readiness score 321 is available, first-party computer system 305 compares it the threshold value. If updated readiness score 321 satisfies the threshold value, then server-side trigger is performed. Otherwise, first-party computer system 305 continues to collect data and add it to beacon data set 311. If the threshold is satisfied, the triggering causes beacon data set 311 to be transmitted to third-party computer system 140.

The method of FIG. 7, it is noted, includes elements 710-740. Method 700, or a portion thereof, may be repeated in response to additional indications from the client computer system that other beacons have been accessed. Method 700 may, in some cases, be performed in parallel by one or more processor cores in the first-party computer system in response to the other beacon accesses. In a similar manner as described above, multiple performances of method 700 may work independently or coherently. Operations of blocks 720-740 may overlap. For example, the readiness score may be updated (730) while additional data is collected (720).

Figure 8:
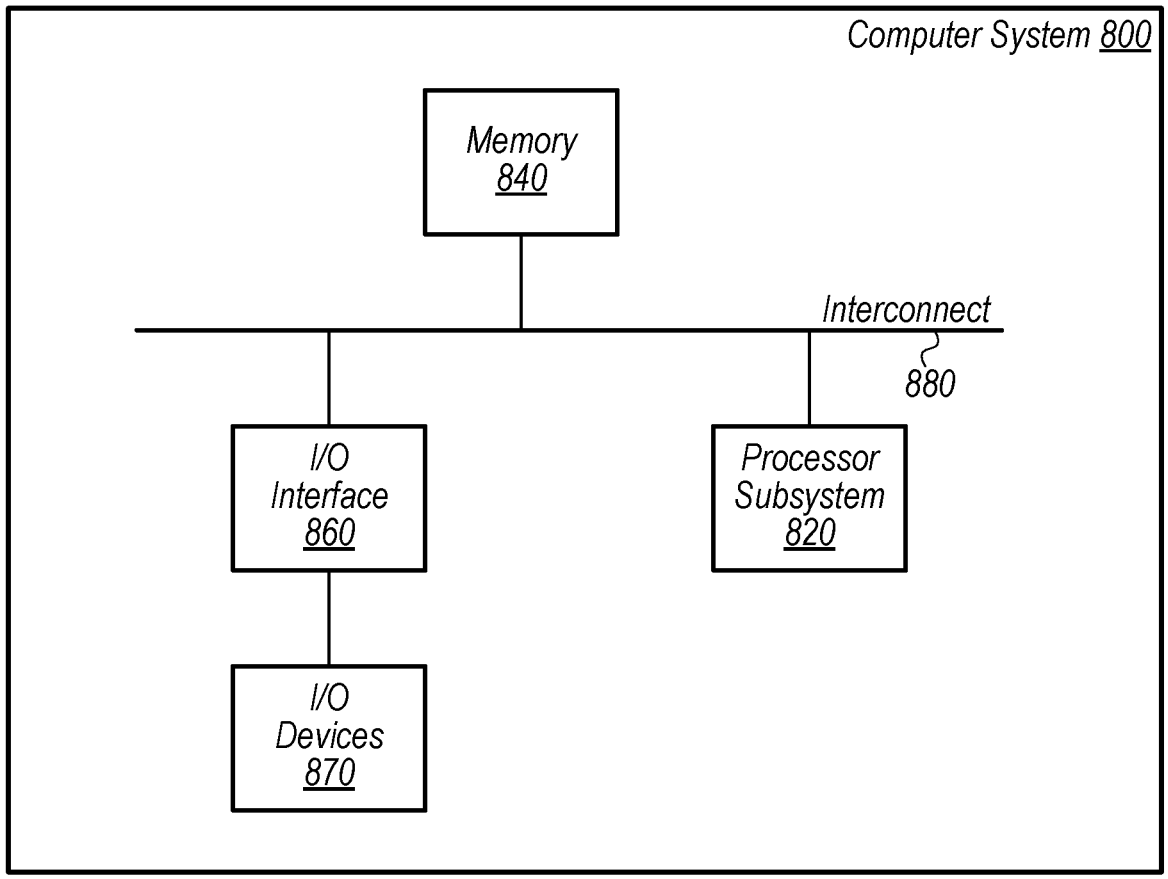
FIG. 8 is a block diagram illustrating an example computer system, according to some embodiments.

Referring now to FIG. 8, a block diagram of an example computer system 800 is depicted. Computer system 800 may, in various embodiments, implement one or more of the disclosed computer systems, such as computer system 101 FIGS. 1 and 4, third-party computer system 140 of FIGS. 1-3, client computer systems 201 and 301 of FIGS. 2-3, and/or first party computer systems 205 and 305 of FIGS. 2-3. Computer system 800 includes a processor subsystem 820 that is coupled to a system memory 840 and I/O interfaces(s) 860 via an interconnect 880 (e.g., a system bus). I/O interface(s) 860 is coupled to one or more I/O devices 870. Computer system 800 may be any of various types of devices, including, but not limited to, a server computer system, personal computer system, desktop computer, laptop or notebook computer, mainframe computer system, server computer system operating in a datacenter facility, tablet computer, handheld computer, smartphone, workstation, network computer, etc. Although a single computer system 800 is shown in FIG. 8 for convenience, computer system 800 may also be implemented as two or more computer systems operating together.

Processor subsystem 820 may include one or more processors or processing units. In various embodiments of computer system 800, multiple instances of processor subsystem 820 may be coupled to interconnect 880. In various embodiments, processor subsystem 820 (or each processor unit within 820) may contain a cache or other form of on-board memory.

System memory 840 is usable to store program instructions executable by processor subsystem 820 to cause computer system 800 perform various operations described herein. System memory 840 may be implemented using different physical, non-transitory memory media, such as hard disk storage, floppy disk storage, removable disk storage, flash memory, random access memory (RAM-SRAM, EDO RAM, SDRAM, DDR SDRAM, LPDDR SDRAM, etc.), read-only memory (PROM, EEPROM, etc.), and so on. Memory in computer system 800 is not limited to primary storage such as system memory 840. Rather, computer system 800 may also include other forms of storage such as cache memory in processor subsystem 820 and secondary storage on I/O devices 870 (e.g., a hard drive, storage array, etc.). In some embodiments, these other forms of storage may also store program instructions executable by processor subsystem 820.

I/O interfaces 860 may be any of various types of interfaces configured to couple to and communicate with other devices, according to various embodiments. In one embodiment, I/O interface 860 is a bridge chip (e.g., Southbridge) from a front-side to one or more back-side buses. I/O interfaces 860 may be coupled to one or more I/O devices 870 via one or more corresponding buses or other interfaces. Examples of I/O devices 870 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 870 includes a network interface device (e.g., configured to communicate over WiFi, Bluetooth, Ethernet, etc.), and computer system 800 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority hereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable medium having instructions stored thereon that are executable by a computer system to perform operations comprising:
   receiving an indication of an access by a user to a web page hosted by a web server, wherein the web page includes a beacon;
   calculating a readiness score for triggering the beacon; and
   determining, based on the readiness score, whether to perform a client-side or server-side triggering of the beacon, wherein the determining identifies either a client computer system or a first-party computer system as a responding computer system; and
   wherein the triggering causes data associated with the access to be transmitted, from the responding computer system to a third-party computer system.

2. The non-transitory computer-readable medium of claim 1, wherein calculating the readiness score includes determining a completeness of collected data associated with the access.

3. The non-transitory computer-readable medium of claim 2, wherein calculating the readiness score further includes determining a reliability of collected data associated with the access.

4. The non-transitory computer-readable medium of claim 3, wherein calculating the readiness score further includes determining a priority for triggering the included beacon.

5. The non-transitory computer-readable medium of claim 1, wherein the operations further comprise, in response to receiving the indication, collecting data associated with the user and adding the collected data to a beacon data set that includes the data associated with the access.

6. The non-transitory computer-readable medium of claim 5, wherein the collected data includes data associated with previous accesses by the user to different web pages that include different beacons.

7. The non-transitory computer-readable medium of claim 5, wherein adding the collected data includes omitting, based on a user-privacy agreement, collected data that includes personal information of the user.

8. The non-transitory computer-readable medium of claim 5, wherein the operations further comprise:
   updating the readiness score in response to adding the collected data; and
   causing, based on the updated readiness score, the beacon data set to be transmitted to the third-party computer system, wherein the third-party computer system performs a web analytics service.

9. A method, comprising:
   receiving, by a client computer system from a first-party computer system, a software process;
   receiving, by the software process executing on the client computer system, an indication of an access by a user to a web page hosted by a web server, wherein the web page includes a beacon;
   calculating, by the software process, a readiness score for triggering the beacon, wherein the readiness score is based on a determined priority for triggering the included beacon; and
   determining, by the software process based on the readiness score, whether to perform a client-side or server-side triggering of the beacon, wherein the determining identifies either the client computer system or the first-party computer system as a responding computer system; and
   wherein the triggering causes data associated with the access to be transmitted, from the responding computer system to a third-party computer system.

10. The method of claim 9, wherein receiving the software process includes receiving the software process in response to accessing, by the client computer system, a first-party beacon associated with the first-party computer system.

11. The method of claim 9, wherein the readiness score is further based on a determined reliability of collected data associated with the access.

12. The method of claim 9, further comprising:
   in response to the indication, collecting, by the software process, data associated with the user and adding the collected data to a beacon data set that includes the data associated with the access;
   updating the readiness score in response to adding the collected data; and
   causing, based on the updated readiness score, the beacon data set to be transmitted to the third-party computer system, wherein the third-party computer system performs a web analytics service.

13. The method of claim 12, wherein collecting data associated with the user includes determining, using one or more configuration files received with the software process, types of data to collect.

14. The method of claim 9, further comprising:
   determining, by the software process based on the readiness score, to perform the client-side triggering of the beacon for a first portion of a beacon data set that includes the data associated with the access; and
   determining, by the software process based on the readiness score, to perform the server-side triggering of the beacon for a second portion of the beacon data set.

15. A method, comprising:
   receiving, by a first-party computer system from a client computer system, an indication of an access by a user to a web page hosted by a web server, wherein the web page includes a beacon, wherein the indication includes data associated with the access and a readiness score for triggering the beacon;

collecting, by the first-party computer system, data associated with the user and adding the collected data to a beacon data set that includes the data associated with the access;

updating the readiness score based on the collected data, wherein the readiness score is based on a determined reliability of collected data associated with the access; and determining, by the first-party computer system based on the updated readiness score, to perform a server-side triggering of the beacon, wherein the server-side triggering causes the beacon data set to be transmitted by the first-party computer system to a third-party computer system.

16. The method of claim 15, wherein updating the readiness score includes determining a completeness of the beacon data set.

17. The method of claim 15, wherein collecting data associated with the user includes accessing a particular database of one or more databases in response to determining that a particular type of information is not currently included in the beacon data set.

18. The method of claim 15, wherein collecting data associated with the user includes accessing a particular database of one or more databases to determine a reliability of a particular piece of information that is currently included in the beacon data set.

19. The method of claim 15, wherein collecting data associated with the user includes accessing a particular database of one or more databases to identify a user-privacy agreement, wherein adding the collected data includes omitting, based on the user-privacy agreement, collected data that includes personal identifiable information of the user.

20. The method of claim 15, further comprising identifying data associated with the user that has been transmitted to the third-party computer system by the client computer system, wherein adding the collected data includes omitting the identified data.

* * * * *